United States Patent
Bonyadi

(10) Patent No.: US 11,883,786 B2
(45) Date of Patent: Jan. 30, 2024

(54) POROUS POLYMERIC MEMBRANE AND RELATED FILTERS AND METHODS

(71) Applicant: ENTEGRIS, INC., Billerica, MA (US)

(72) Inventor: Sina Bonyadi, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 164 days.

(21) Appl. No.: 17/066,209

(22) Filed: Oct. 8, 2020

(65) Prior Publication Data

US 2021/0106953 A1 Apr. 15, 2021

Related U.S. Application Data

(60) Provisional application No. 62/913,465, filed on Oct. 10, 2019.

(51) Int. Cl.
*B01D 71/68* (2006.01)
*B01D 71/64* (2006.01)
*B01D 67/00* (2006.01)

(52) U.S. Cl.
CPC ......... *B01D 71/68* (2013.01); *B01D 67/0016* (2013.01); *B01D 71/64* (2013.01); *B01D 2221/14* (2013.01); *B01D 2325/023* (2013.01); *B01D 2325/04* (2013.01)

(58) Field of Classification Search
CPC .... B01D 71/68; B01D 67/0016; B01D 71/64; B01D 2221/14; B01D 2325/023; B01D 2325/04; B01D 61/02; B01D 61/14; B01D 2325/022; B01D 2325/025; B01D 69/06; B01D 69/02; B01D 67/0002; B01D 61/00; B01D 71/06; B32B 5/18; B32B 5/32; B32B 2264/0235; B32B 2266/0214; B32B 2266/0257; B32B 2266/0264; B32B 2266/06
See application file for complete search history.

(56) References Cited

U.S. PATENT DOCUMENTS

| | | | |
|---|---|---|---|
| 4,286,015 A | 8/1981 | Yoshida | |
| 5,340,480 A | 8/1994 | Kawata | |
| 5,472,607 A | 12/1995 | Mailvaganam | |
| 6,409,921 B1 | 6/2002 | Müller | |
| 6,497,752 B1 | 12/2002 | Kessler | |
| 7,208,200 B2 * | 4/2007 | Kools | B29C 41/36 427/244 |
| 2002/0113006 A1 * | 8/2002 | Sale | B01D 69/06 264/48 |
| 2004/0050791 A1 | 3/2004 | Herczeg | |

(Continued)

FOREIGN PATENT DOCUMENTS

| CN | 1265047 C | 7/2006 |
|---|---|---|
| CN | 104874296 A | 9/2015 |

(Continued)

OTHER PUBLICATIONS

Microza Membranes = Polysulfone—Hollow Fiber Modules (2019).

*Primary Examiner* — Krishnan S Menon

(57) ABSTRACT

Described are porous polymeric membranes that include two opposing sides and that have a variable pore structure through a thickness of the membrane; filter components and filters that include this type of porous polymeric membrane; methods of making the membranes, filter components, and filters; and methods of using the polymeric filter membrane, filter component, or filter.

19 Claims, 5 Drawing Sheets

(56) References Cited

U.S. PATENT DOCUMENTS

| | | |
|---|---|---|
| 2005/0145107 A1 | 7/2005 | Kessler |
| 2016/0052804 A1 | 2/2016 | Nosaka |
| 2016/0317976 A1 | 11/2016 | Hester |
| 2017/0225127 A1 | 8/2017 | Peinemann |
| 2020/0139309 A1 | 5/2020 | Cheng |
| 2020/0289990 A1 | 9/2020 | Bonyadi |

FOREIGN PATENT DOCUMENTS

| | | |
|---|---|---|
| CN | 105169973 A | 12/2015 |
| CN | 108079795 A | 5/2018 |
| CN | 108380047 A | 8/2018 |
| CN | 215693239 U | 2/2022 |
| EP | 1007195 B1 | 3/2006 |
| JP | S58156018 A | 9/1983 |

* cited by examiner

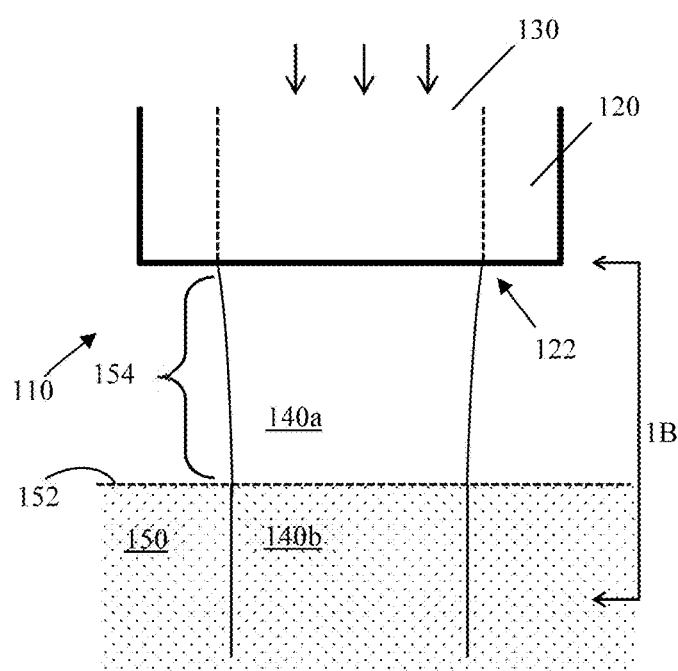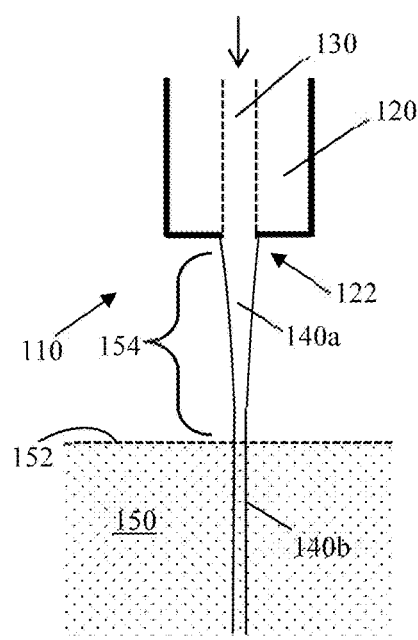
Fig. 2A
Fig. 2B

POROUS POLYMERIC MEMBRANE AND RELATED FILTERS AND METHODS

CROSS-REFERENCE TO RELATED APPLICATIONS

This application claims the benefit under 35 USC 119 of U.S. Provisional Patent Application No. 62/913,465 filed Oct. 10, 2019, the disclosure of which is hereby incorporated herein by reference in its entirety.

FIELD

The following description relates to porous polymeric filter membranes that include two opposing sides and that have a variable pore structure through a thickness of the membrane; additionally to filter components and filters that include this type of porous polymeric filter membrane; to methods of making the porous polymeric filter membranes, filter components, and filters; and to methods of using a porous polymeric filter membrane, filter component, or filter, to filter a fluid such as a liquid chemical to remove unwanted material from the fluid.

BACKGROUND

A major application of filter membranes is to remove unwanted materials from a flow of a useful fluid. Many gaseous and liquid fluids in industry are processed using filters, including environmental air, drinking water, liquid industrial solvents and processing fluids, industrial gases used for manufacturing or processing (e.g., in semiconductor fabrication), and liquids that have medical or pharmaceutical uses. Unwanted materials that are removed from fluids include impurities and contaminants such as particles, microorganisms, and dissolved chemical species. Specific examples of impurity removal applications for filter membranes include their use to remove particles or bacteria from therapeutic solutions in the pharmaceutical industry, to process ultrapure aqueous and organic solvent solutions for use in microelectronics and semiconductor processing, and for air and water purification processes.

To perform a filtration function, a filter product includes a filter membrane that is responsible for removing the unwanted material from the fluid. The filter membrane may, as required, be in the form of a flat sheet, which may be wound (e.g., spirally), or pleated, etc. The filter membrane may alternatively be in the form of hollow fibers. The filter membrane can be contained within a housing that includes an inlet and an outlet, so that fluid that is being filtered enters through the inlet and passes through the filter membrane before passing through the outlet.

Filter membranes can be constructed of porous polymeric films that have average pore sizes that can be selected based on the expected use of the filter, i.e., the type of filtration to be performed using the filter. Typical pore sizes are in the micron or sub-micron range, such as from about 0.001 micron to about 10 micron. Membranes with average pore size of from about 0.001 to about 0.05 micron are sometimes classified as ultrafilter membranes. Membranes with pore sizes between about 0.05 and 10 microns are sometimes classified as microporous membranes.

For commercial use, a filter membrane should be of a type that can be efficiently manufactured and assembled into a filter product. The membrane must be capable of being efficiently produced, and must have mechanical properties such as strength and flexibility that allow the filter membrane to withstand assembly into the form of a filter cartridge or a filter. In addition to mechanical properties, the membrane should have suitable chemical functionality and microstructure for high performance filtration.

Various techniques are known for forming porous filter membranes. Example techniques include melt-extrusion (e.g., melt-casting) techniques and immersion casting (phase inversion) techniques, among others. The different techniques for forming a porous material may produce different porous membrane structures in terms of the size and distribution of pores that are formed within the membrane, i.e., different techniques produce different pore sizes and membrane structures, sometimes referred to as morphology, meaning the uniformity, shape, and distribution of pores within a membrane.

Examples of membrane morphologies include homogeneous (isotropic) and asymmetric (anisotropic). A membrane that has pores of substantially uniform size uniformly distributed throughout the membrane is often referred to as isotropic, or "homogeneous." An anisotropic (a.k.a., "asymmetric") membrane may be considered to have a morphology in which a pore size gradient exists across the membrane; for example, the membrane may have a porous structure with relatively larger pores at one membrane surface, and relatively smaller pores at the other membrane surface with the pore structure varying along the thickness of the membrane. The term "asymmetric" is often used interchangeably with the term "anisotropic." Often, a portion of a membrane that has relatively smaller pores (compared to other regions of the membrane) is referred to as a "tight" region. A portion of the membrane that has larger pores is often called an "open" region.

Industries that use filters, including industries of making and processing semiconductor materials and microelectronic devices, have ongoing interest in finding improved filter membranes and filters, including new filter products that have improved performance, such as improved retention. The new filters should be capable of being produced with efficiency and in a manner that is cost effective, e.g., profitable.

SUMMARY

The field of microelectronic device processing (e.g., microelectronic and semiconductor device fabrication) requires steady improvements in processing materials and methods, to sustain parallel steady improvements in the performance (e.g., speed and reliability) of microelectronic devices. Opportunities to improve microelectronic device fabrication exist in all aspects of the manufacturing process, including methods and systems for filtering liquid materials used during fabrication.

Two important aspects of commercial filter membrane manufacturing are efficient and cost-effective manufacturing, and high performance in terms of retention, which relates to the amount of particles a filter membrane is capable of removing from a stream of fluid.

A technique that may be effective to improve retention is to use multiple membranes in series, such as by contacting the filtering surfaces of two membranes together in a stack, and passing fluid through both membranes in series. This may sometimes be referred to as "layering" or "stacking" of filter membranes to form a multi-layer membrane. When a layering technique is performed using asymmetric membranes, each having a "tight" region and an "open" region, the fluid passing through the two membranes must pass through both "tight" regions, and retention of the membrane may be increased.

While layering techniques are feasible and potentially effective, using two layered membranes doubles the cost for the materials of the membrane. Hence, it is of interest to replicate the structure of two membranes, i.e., a two-layer stacked membrane, into one single integral membrane made by a single membrane formation step, i.e. to fabricate a single integral membrane that includes two tight layers, e.g., a "double-tight" membrane, using a single manufacturing step. The two tight layers of the membrane are preferably not prepared using separate steps and then combined, e.g., the membrane is not made by combining two separate membranes into a multi-layer membrane.

Accordingly, the present description relates to membranes that are integrally formed, in a single formation step, to include two tight regions and at least one open region, and to the methods of preparing the membranes, as well as methods of using the membrane as a filter membrane and filter products that incorporate the membranes. Such a porous membrane can be prepared by a novel and inventive method by which a polymeric solution is extruded through a die in the form of a polymer solution film, followed by exposing both opposing sides of the film to a condition that causes polymer in the film to coagulate on both sides of the film, especially to produce a tight morphology on both sides of the coagulated film.

As examples of methods useful for preparing a membrane as described, having a morphology as described, the membrane may be formed by forming an extruded liquid film of liquid polymer solution that contains non-coagulated or partially-coagulated polymer dissolved or suspended in solvent, and causing the polymer to coagulate within the film by simultaneously exposing both of two opposed surfaces of the film to a condition (e.g., temperature, nonsolvent, humidity, evaporation) that will cause coagulation of the dissolved polymer on both sides of the film substantially at the same time and in the same manner. By one example, a technique of causing coagulation is by a nonsolvent-induced phase separation (NIPS) technique. By another example, coagulation of the polymer can be caused by thermally-induced phase separation (TIPS). By another example coagulation of the polymer can be caused by exposing the extruded film to humidity. By another example, coagulation of polymer can be caused by evaporation of solvent of the extruded film.

In one aspect, an extruded porous polymeric sheet membrane comprises a first surface, a second surface, and a thickness between the first surface and the second surface, a first thickness region that includes the first surface and a portion of the membrane in a direction of the thickness, a second thickness region that includes the second surface and a portion of the membrane in a direction of the thickness, and a third thickness region extending in the direction of the thickness between the first thickness region and the second thickness region. An average pore size of the first thickness region and an average pore size of the second thickness region are both less than an average pore size of the third region.

In another aspect, a method of making an extruded porous polymeric sheet membrane having opposed first and second surfaces, a thickness between the opposed surfaces, and pores having non-uniform pore size includes forming a polymer-containing liquid comprising polymer in solvent; passing the polymer-containing liquid through an extrusion die to form an extruded film of the polymer-containing liquid; and exposing both sides of the extruded film to a condition that will cause coagulation of the polymer on both sides of the film.

BRIEF DESCRIPTION OF THE DRAWINGS

FIGS. 2A, 2B, 3A, and 3B are illustrations (schematic, and not necessarily to scale) of example methods and systems of the present description.

DETAILED DESCRIPTION

Figure 1A:
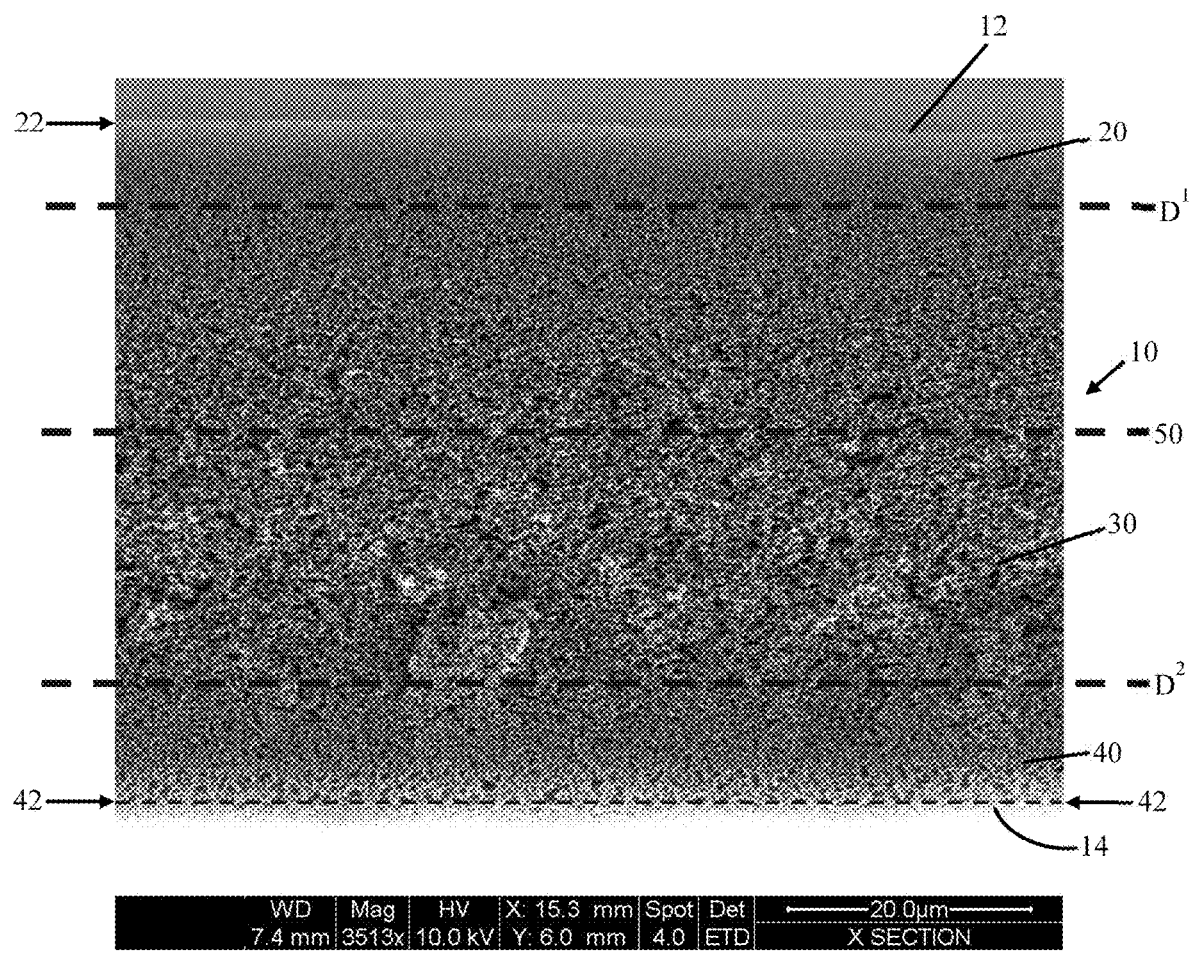
FIGS. 1A and 1B are photographs in cross section of membranes of the present description.

The following description relates to extruded porous polymeric membranes that can be effective as filter membranes, filter products that include the filter membrane, and to related methods of preparing and using the porous membranes.

The porous polymeric membranes have two opposed surfaces (or opposed "sides") and a thickness between the two opposed surfaces. The pores of the porous membrane are located across the thickness of the membrane to allow for a flow of fluid from one side of the membrane, through the thickness of the membrane, to and through the opposite side of the membrane, while removing particle or contaminant materials from the fluid. Accordingly, the membrane is permeable to a fluid such as a liquid. This type of membrane is sometimes referred to as an "open pore" membrane, as compared to "closed pore" membrane. The open pore membrane can be in the form of a thin film or sheet of extruded porous polymeric material having a relatively uniform thickness and an open pore porous structure that includes a polymeric matrix that defines a large number of open "cells," which are three-dimensional void structures or pores. The open cells can be referred to as openings, pores, channels, or passageways that are largely interconnected between adjacent cells to allow fluid such as a liquid fluid to flow through the thickness of the membrane from one side of the membrane to the other side.

A porous membrane as described includes pores of different pore sizes, with the sizes of the pores within the membrane varying along the thickness of the membrane. As used herein, "pore size" refers to the size (e.g., average size) of pores in a region (or "portion") of the membrane such as a region of a thickness located between two different depths of a membrane, or at a specific depth of the membrane defined relative to the thickness of the membrane. For example, a region of a membrane may be a portion of the membrane between a surface and a specified depth of the membrane, e.g., a depth of 10 microns below a surface. As another example, a region of a membrane may be a portion located between two different depths, such as a portion of the membrane located at a central third of the thickness of the membrane.

A porous membrane as described has a morphology with respect to pore size that is non-uniform (non-isotropic, non-homogeneous) across the thickness of the membrane. The non-uniform morphology may be referred to as a "variable" morphology having multiple (e.g., at least three) regions of different pore sizes at different locations along the thickness of the membrane. Within the context of the present description, a membrane that has a "variable pore structure" is one that includes pores of different sizes over the thickness of the membrane between the two opposed surfaces of the membrane. The size of pores may change gradually over a thickness (based on depth) of a membrane, or may change non-gradually. (See, e.g., FIGS. 2A, 2B, 3A, and 3B.)

Membranes of the present description, more particularly, include two "tight" regions and at least one "open" region located between the two "tight" regions; these membranes are referred to herein as "double-tight" membranes, or membranes having a "double-tight" morphology. One region of the membrane is a region that can be referred to as a "tight region," meaning a region having smaller pores on a relative basis across the membrane thickness. A second region of the membrane is a second tight region also having smaller pores on a relative basis across the membrane thickness. At an interior (or "intermediate") of the membrane is an "open region" located in-between the two opposed tight regions. The "open" region is a portion of the thickness that includes pores that are relatively larger than pores of both of the two tight regions. With this configuration, i.e., two tight regions and an open region at an interior of the membrane, between the two tight regions, a membrane as described may be referred to as "double-tight" porous membrane having a "variable" pore size.

The porous membrane having two tight regions and an open interior region is considered to be "integral." In specific, the entire thickness and both opposed surfaces of the membrane are formed and constructed together as a structurally single and continuous membrane by a single formation step, e.g., by a single step (which includes co-extrusion using a multi-slot die) that involves extrusion of a film and coagulation of polymer of the film.

In contrast to the described integral porous membrane, other types of known porous membranes may be non-integral. These include membranes, sometimes referred to as multi-layer or "composite" membranes, which are prepared by combining or placing and optionally attaching or bonding together two separate membrane layers, each of which has a different morphology or chemical composition, at opposed surfaces. Such a composite membrane may include a multilayer structure formed by combining a first porous membrane layer formed in one formation step and having a first (e.g., larger pore size) morphology, with a second porous membrane layer formed in a second formation step that is different from the step that forms the first porous layer. This type of multi-layer or "composite" membrane structure formed from multiple separate films made by multiple steps is not considered to be an "integral" membrane.

Other examples of membranes that are not considered to be integral according to the present description are porous membranes that are coated on one or both surfaces, i.e., that include a base membrane made during a membrane-forming step and one or more coatings (e.g., one or more polymeric coatings) applied to one or more surfaces of the base membrane in a subsequent coating step. Example membranes may be homogeneous (or non-homogenous) base membranes that have a relatively uniform (or non-uniform) pore size throughout and that after being formed are coated at one or both surfaces with polymer. The polymer coating may be the same or different from the polymer of the base membrane. The polymer coating may reduce pore sizes at the one or two coated surfaces.

A membrane of the present description can have any useful thickness, such as a thickness in a range from 10 to 300 microns, for example in a range from 25 or 40 microns, up to 250 or 200 microns.

The membrane includes two opposed relatively parallel surfaces that extend in both of a length direction and a width direction, and a thickness that extends in a third direction and is located between the two opposed surfaces. A location half-way between the two surfaces is considered to be an imaginary "midline" that bisects the thickness of the membrane, i.e., extends in the length and width directions at an equal distance from each of the two opposed surfaces.

A "thickness region" of the membrane is a portion of the membrane that extends in the length and width dimensions of the membrane over a constant portion of the thickness of the membrane. With respect to the present description and claims, a membrane can be considered to include at least three thickness regions: a first tight region, one open region, and a second tight region. The open region is located between the two tight regions. One or both of the tight regions may include a surface of the membrane, but neither tight region is required to include a surface.

In a particular example, a membrane may include thickness regions that include: a first thickness region that includes a first surface of the membrane and extends to a depth below the first surface but not to a midline of the membrane; a second thickness region that includes the second surface of the membrane and extends to a depth below the second surface but not to the midline of the membrane; and a third thickness region that extends across the remaining portion of the thickness of the membrane between the first thickness region and the second thickness region and that optionally and typically includes the midline. Examples of a useful depth below a first surface of a membrane that defines the size (thickness) of the first thickness region relative to a total thickness of a membrane include a depth that is equal to 2, 5, 10, 20, 25, 30, or 33 percent of the total thickness of the membrane. Likewise, examples of a useful depth below a second surface of a membrane that defines the size (thickness) of the second thickness region relative to a total thickness of a membrane include a depth that is equal to 2, 5, 10, 20, 25, 30, or 33 percent of the total thickness of the membrane.

According to example membranes, a double tight morphology can be defined in terms of relatively small average pore sizes of each of the two tight regions, compared to a relatively larger pore size of an open region. The average pore size of a tight region may be of any average pore size of a tight portion of a useful filter membrane, including but not limited to an average pore size in a range from 1 nanometer to 10 microns, e.g., in a range from 1 nanometer to 5 microns or from 10 nanometers to 1 or 2 microns. A first tight region and a second tight region may each independently have average pore sizes that are the same, or that are not the same, with both average pore sizes being within one of the stated ranges. An average pore size of an open region may be any average pore size of an open portion of a useful filter membrane, including but not limited to an average pore size of greater than 10 microns, e.g., in a range from 5 nanometers to 50 microns, such as from 20 nanometers to 10 microns, or from 50 nanometers to 1, 2, or 5 microns. Alternately or additionally, an average pore size of an open region also can be of a size that is greater than an average pore size of one or both tight regions by an amount of at least 10, 20, 50, or 100 percent, or more; i.e., an average pore size of an open region can be at least 10, 20, 50, or 100 percent greater than an average pore size of the average pore sizes of both tight regions.

When considering the size of thickness regions along the thickness of the membrane, the invention does not require a particular size of each region or relative size of the regions, other than that the average pore sizes of the regions are as described, and that the first thickness region includes a depth location of a first minimum pore size on one side of the midline, and that the second thickness region includes a depth location of a second minimum pore size on the second side of the midline; the minimum pore size of the third region is greater than the first minimum pore size and is greater than the second minimum pore size.

More specifically, a double tight morphology may alternatively or additionally be defined in terms of the presence of two different "minimum" pore sizes (smallest measured pore sizes), each independently located at a particular depth of the membrane, and each on an opposite side of the midline of the membrane. A "minimum" pore size is a smallest measured pore size on a side of the midline, measured over at least a portion of the area of the membrane at a single uniform depth below the surface of the membrane. According to these described membranes, the membrane has a first minimum pore size at a certain depth on one side of the midline, and a second minimum pore size at a certain depth on a second side of the midline. The depth of the first minimum pore size from the first surface may be the same or different compared to the depth of the second minimum pore size from the second surface. The first minimum pore size will be a minimum pore size that is present at a specific depth between the midline and the first surface. The second minimum pore size will be a minimum pore size that is present at a specific depth between the midline and the second surface. These two minimum pore sizes are the two smallest pore sizes of the membrane, and the membrane does not have any other depth at which a lower average pore size is present.

According to certain example embodiments, a minimum pore size (first minimum or second minimum pore size) may be located at a surface (first surface or second surface) (the depth of the location of the minimum pore size is zero) or near a surface, e.g., within 2, 5, 10, or 20 percent of the thickness of the membrane, from the surface.

Each of the locations of the first minimum pore size and the second minimum pore size can, independently, be at a surface or at a depth from the surface. E.g., the location of the first minimum pore size may be at the first surface (at a depth of zero) while the location of the second minimum pore size is at the second surface; the location of the first minimum pore size may be below the first surface while the location of the second minimum pore size is below the second surface; the location of the first minimum pore size may be at the first surface while the location of the second minimum pore size is below the second surface; or the location of the first minimum pore size may be below the first surface while the location of the second minimum pore size is at the second surface.

Average pore size of a region of a membrane, or at a particular depth of a membrane, can be measured by any useful technique, including by manual or electronic visual review of an image prepared by scanning electron microscope (SEM). By examples of these methods, a computer software program may be used to assess sizes of pores in a region or at a depth of a membrane. By other examples, a hard copy of an SEM photomicrograph may be visually inspected to measure pore sizes at a region or at a depth of a membrane.

Example membranes can be described in terms of a degree of asymmetry, which is a relationship between a measure of pore size of an open region, to a measure of pore size of a tight region. A degree of asymmetry (D) of a membrane as described can be defined as:

$$D = (\text{average pore size of the third thickness region})/A$$

A can be defined as one of: the average pore size of the first region; the average pore size of the second region; the first minimum pore size, or the second minimum pore size.

Useful and preferred membranes of the present description can have a degree of asymmetry (D) of at least 5, such as at least 10, 20, or 30, when calculated using or more of the different possible pore sizes of group A.

Referring to FIG. 1A, a cross-section of example porous membrane 10 is shown, having a surface 12, a second surface 14, and a thickness between these two surfaces. Midline 50 is located half-way between surfaces 12 and 14. A first thickness region 20 is located at the thickness region between surface 12 and a first depth D'. A second thickness region 40 is located at the thickness region between second surface 14 and a second depth $D^2$. A third thickness region 30 is located at the thickness region between first thickness region 20 and second thickness region 40. An average pore size of each of the first thickness region 20, the second thickness region 40, and the third thickness region 50, can be measured over the three-dimensional thickness of each region. According to the present description, the average pore size of pores of the first thickness region is substantially (e.g., measurably) less than the average pore size of pores of the third thickness region, and the average pore size of pores of the second thickness region is substantially less than the average pore size of pores of the third thickness region.

FIG. 1A also shows a depth 22 of a first minimum pore size located at a depth at one side of midpoint 50. Depth 22 of the first minimum pore size, as illustrated, is a depth of zero, meaning the first minimum pore size is located at surface 12. FIG. 1A also shows depth 42 as a second minimum depth located on a second side of midpoint 50, and which is located at a depth slightly below second surface 14. The first minimum pore size and of the second minimum pore size are located at respective depths that are at or below each of surfaces 12 and 14, and each depth is measured as a depth of the membrane at which pores extending along the length and width of the membrane have a smallest average pore size relative to all of the pores on the same side of midpoint 50, i.e., within membrane 10 between surface 12 and midpoint 50 (depth 22) and within membrane 10 between surface 14 and midpoint 50 (depth 42). Each minimum pore size is the smallest average pore sizes of any particular depth, on each side of the midline, and each side of the membrane relative to the midline does not have any other depth having an average pore size that is lower than its minimum pore size.

Figure 1B:
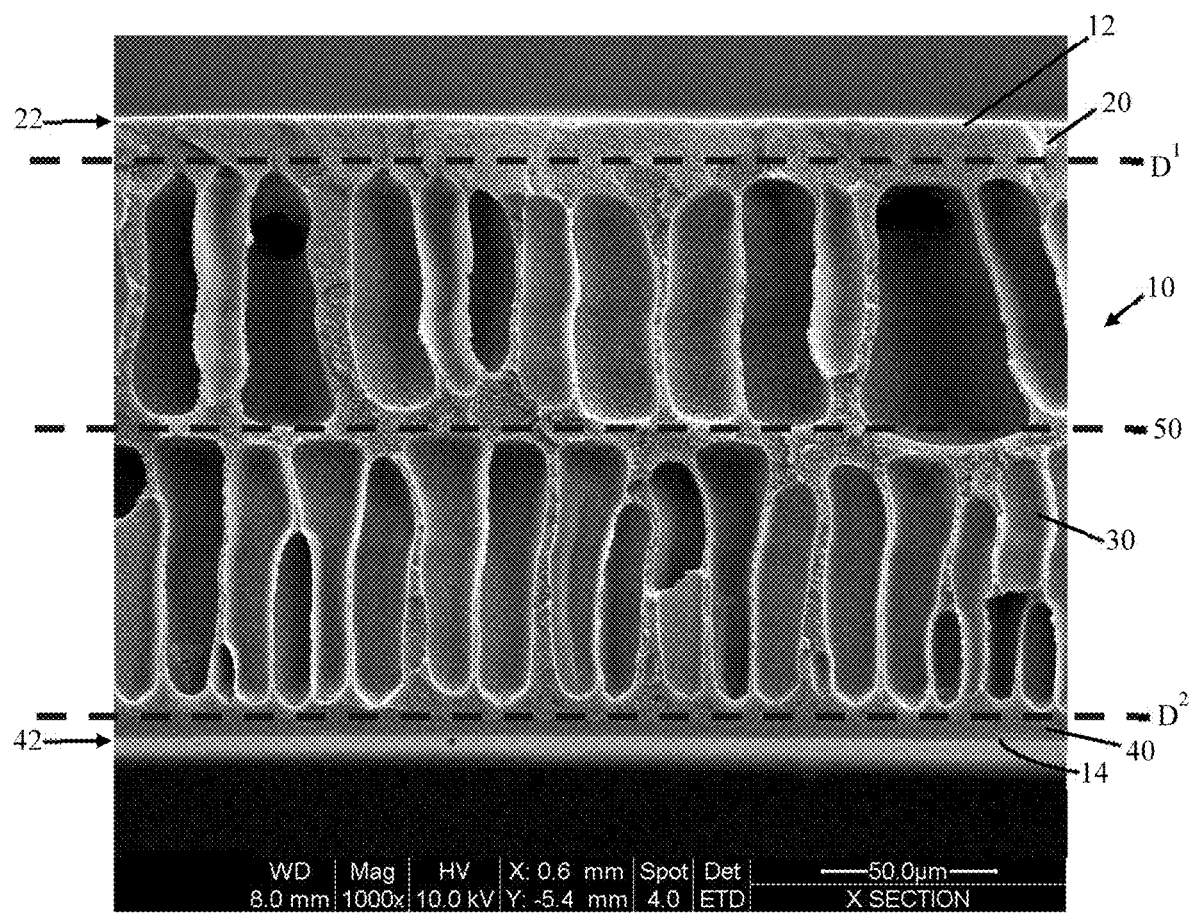

Referring to FIG. 1B, a cross-section of porous membrane 10 is shown, having a surface 12, a second surface 14, and a thickness between these two surfaces. Midline 50 is located half-way between surfaces 12 and 14. A first thickness region 20 is located at the thickness region between surface 12 and a first depth D'. A second thickness region 40 is located at the thickness region between second surface 14 and a second depth $D^2$. A third thickness region 30 is located at the thickness region between first thickness region 20 and second thickness region 40, e.g., between depth $D^1$ and depth $D^2$. An average pore size of pores throughout each of the first thickness region 20, the second thickness region 40, and the third thickness region 50, can be measured over the three-dimensional thickness region. According to the present description, the average pore size of pores of the first thickness region is substantially less than the average pore size of pores of the third thickness region, and the average pore size of pores of the second thickness region is substantially less than the average pore size of pores of the third thickness region.

FIG. 1B also shows a depth 22 of a first minimum pore size located at a depth relative to or at a surface of membrane 10 on one side of midpoint 50, as well as a depth 42 of a second minimum pore size located at a depth relative to or at a second surface of membrane 10 on a second side of midpoint 50. In the illustrated membrane, the location of first minimum pore size 22 and the location of second minimum pore size 42 are each at or near surfaces 12 and 14, respectively. Each of the two minimum pore sizes is the smallest average pore size on one side of the membrane relative to the midline, and each side of the membrane does not have any other depth having an average pore size lower than its minimum pore size.

A porous film as described can be prepared by methods that include novel and inventive methods of forming a polymeric extruded film, including by exposing both surfaces of the film to a condition that causes polymer of the film to coagulate, with the condition being the same condition applied in the same manner to both surfaces. Because both surfaces of the extruded film are exposed to the same condition that causes coagulation, and in the same manner and with the same timing, a method as described can be effective to form a coagulated film that includes two opposing surfaces having pores formed simultaneously by the same coagulation step; the pores on each of the two opposed surfaces may be smaller than pores of an interior region of the membrane, to produce a "double tight" membrane; the pores of the two opposed surfaces may be of a comparable morphology to each other due to each surface undergoing coagulation based on substantially the same or similar coagulation-inducing conditions and timing. The resultant coagulated film includes two opposed (tight) surfaces or thickness regions that have similar, comparable, or substantially the same morphologies, one on each side of a midline, and also includes an interior region that has a morphology that is different from (open) the morphologies of the two surfaces. Example membranes can have one surface or region that has a morphology with a relatively small pore size, a second (opposite) surface or region that also has a morphology with a relatively small pore size, and an interior portion between the two surfaces or regions that has a morphology with a relatively larger pore size compared to the first and second surfaces.

As examples of methods useful for preparing a membrane as described, having a morphology as described, the membrane may be formed by forming an extruded liquid film of liquid polymer solution that contains non-coagulated (optionally, also, an amount of coagulated or partially-coagulated) polymer dissolved (or suspended) in solvent, and causing the polymer to coagulate within the film by concurrently or simultaneously exposing both of the two opposed surfaces of the film to a condition (e.g., temperature, nonsolvent, humidity, solvent evaporation) that will cause concurrent or simultaneous coagulation of the polymer at both of the two opposed surfaces. By one example, a technique of causing coagulation is by a nonsolvent-induced phase separation (NIPS) technique. By another example, coagulation of the polymer can be caused by thermally-induced phase separation (TIPS).

By conventional nonsolvent-induced phase separation (NIPS), generally a polymer solution that contains polymer dissolved or suspended in solvent is extruded and cast onto a supporting layer (e.g., a supportive polymeric film) to form a cast film. The cast film has one surface that contacts and is covered by the supporting layer and another (opposite) surface that is exposed or open. The supporting layer and the extruded and cast film are then submerged in a coagulation bath that contains "nonsolvent," meaning a liquid in which the polymer is not substantially soluble. Upon submersion of the cast film in the nonsolvent, an exchange of solvent and nonsolvent occurs at the one exposed surface, between the nonsolvent bath and the solvent of the extruded film polymer solution. With that solvent exchange, nonsolvent becomes present with the polymer in the cast film to cause the polymer to precipitate out of the cast polymer solution film onto the supporting layer. The polymer must be highly soluble in the solvent of the polymer solution and substantially insoluble in the "nonsolvent" of the bath so that the polymer efficiently precipitates or coagulates upon contact with the nonsolvent (e.g., aqueous liquid) of the coagulation bath.

According to these techniques, the liquid nonsolvent contacts only one surface, which is the exposed surface, of the cast polymer solution film, but does not contact the opposite surface of the film, which is in contact with the supporting layer. Because the nonsolvent contacts only one surface of the cast film, and solvent-exchange occurs only through that one surface of the cast film, the coagulated polymer film exhibits a morphology that is non-homogeneous, e.g., asymmetrical, and is different on one side of the film compared to the other side of the film. Typically, the film, after coagulation, has an asymmetric morphology that includes a first morphology on one side of the membrane, a substantially different second morphology on the second side of the membrane, and an intermediate morphology between the two sides that changes across the thickness of the film, e.g., with gradually changing pore sizes over a range of pore sizes that is between the pore size on one surface and the pore size on the second surface. As an example, one surface may have a relatively small average pore size, an opposite side may have a relatively larger average pore size, and all locations (depths) between the two surfaces will have average pore sizes that are between the two average pore sizes of the opposed surfaces. Optionally, one surface can be considered to exhibit a "tight" morphology and the second surface can be considered to exhibit an "open" morphology.

A comparable effect can occur with the use of conventional thermally-induced phase separation (TIPS) techniques. By conventional TIPS techniques, generally, polymer-containing liquid that contains non-coagulated polymer (and, optionally, partially coagulated polymer) in solvent is extruded through a slot die to form an extruded film. By a conventional TIPS method, one side of the extruded film is brought to a reduced temperature that will cause coagulation of the polymer of the extruded film, for example by contacting with a low temperature "chill roll."

By this technique, one surface of the extruded film is exposed to the reduced temperature. The opposite surface is not exposed directly or indirectly to the reduced temperature, resulting in a difference in the manner by which the polymer coagulates on one surface of the extruded film relative to the opposite surface. Because only one side of the film is exposed to the reduced temperature, the coagulated polymer film exhibits a morphology that is non-homogeneous and is substantially different on one side of the film compared to the other side of the film. Typically, the film, after coagulation, has an asymmetric morphology that includes a first morphology on one side of the film, a substantially different morphology on the second side of the film, and an intermediate morphology between the two sides. As an example, one surface may have a relatively small average pore size, an opposite side may have a relatively larger average pore size, and all locations (depths)

between the two surfaces will have average pore sizes that are between the two average pore sizes of the opposed surface. Optionally, one surface can be considered to exhibit a "tight" morphology and the second surface can be considered to exhibit an "open" morphology.

Example methods of the present description differ from previous phase separation techniques used to form porous polymeric membranes at least because the presently-described example methods expose both surfaces of an extruded (including co-extruded) film to an identical or comparable condition that causes coagulation, to a relatively equal or comparable degree. The condition may be contact with a liquid "nonsolvent," or a condition of a reduced temperature, for example a liquid bath with a lower temperature. Compared with the extruded film methods as described, the present method does not require and can preferably not include a step of casting the extruded film of polymer solution onto a supporting layer (e.g., a polymeric film or release liner), or placing only one side of the extruded film (e.g., through a supporting layer) in contact with a chilled surface such as a chill roll. According to the inventive methods, both surfaces of the extruded film are exposed to the same condition that is effective to cause coagulation, at the same time, and optionally to the same extent (depending, e.g., on the identity of the polymer on each surface), e.g., simultaneously. By exposing both surfaces of the extruded film to the same coagulation-inducing condition in an equal or a comparable manner, the condition affects both sides of the film in a similar manner to cause a coagulation effect on both sides of the film and, upon coagulation, produces a membrane that includes two opposed surfaces or sides that each have a tight morphology relative to an interior region of the membrane, optionally two opposed comparable or identical morphologies.

According to example and preferred embodiments for preparing a membrane as described, a polymer can be combined with solvent (e.g., dissolved, completely, in the solvent) to form a polymer-containing liquid that contains polymer in a non-coagulated or partially coagulated form (referred to herein as a "polymer solution" or a "polymer-containing liquid") that can be extruded into sheet form as a liquid and subsequently caused to coagulate on both sides of the sheet, such as by use of an immersion precipitation method, e.g., a TIPS method or a NIPS method, or another method such as exposure to humidity or by solvent evaporation. A single polymer-containing liquid may be used, or multiple polymer-containing liquids may be used for a co-extruded film A general method may be performed using one or more steps that include: forming or otherwise providing one or more polymer-containing liquids that include polymer for preparing a porous polymeric membrane, dissolved or suspended in solvent; extruding (including co-extruding) the one or more polymer-containing liquids from a die to form an extruded (including co-extruded) sheet or film that includes the polymer-containing liquid; causing the polymer of the polymer-containing liquid to coagulate (e.g., precipitate) from the polymer-containing liquid to form a coagulated porous polymeric membrane ("porous polymeric membrane"); and optionally drying or otherwise further processing the formed porous polymeric membrane.

An example of such a method can include the use of an extrusion die to extrude one or more polymer-containing liquids as a film. The extrusion die may be a single-slot die or a multi-slot die. A single-slot die can be used if only a single polymer-containing liquid is used to form the film. A multi-slot die may be used if the film will be formed using two or more different polymer types or polymer-containing liquids. If a multi-slot die is used, and if two or more different polymers or polymer-containing liquids are used, the extruded film is considered to be a single extruded film upon being extruded, even if the compositions of the polymers are chemically or physically different; the co-extruded film is considered to be a single and integral film. The co-extruded film from a multi-slot die will be exposed to a coagulated-inducing condition only on the two opposed surfaces, and the resultant coagulated film membrane is considered to be formed in a single extrusion step and is considered to be an integral membrane.

Any effective extrusion conditions and processing parameters may be used, including a useful draw speed of the extruded film, a useful flow rate of the polymer-containing liquid, air-gap distance between the die and the coagulation bath (if any), the humidity of the air in the air-gap region (if any), and a useful, optionally conventional type and size of die. The flow rate of polymer-containing liquid passing through the die, and the draw speed of the extruded film can be used to affect the thickness of the extruded film.

After being extruded, the film is exposed on both sides to a condition that will cause coagulation of polymer contained in the extruded film. For example, the extruded film can be brought to contact a coagulation bath that includes a liquid having a lower temperature than the extruded film or containing "nonsolvent," or both, to cause coagulation of polymer contained in the extruded film. An example coagulation bath for a TIPS method can be a liquid bath such as water, having a temperature that causes coagulation of dissolved (non-coagulated) polymer from the polymer-containing liquid of the extruded film, e.g., a liquid that has a temperature of below 30, 20, or 10 degrees Celsius. An example coagulation bath for NIPS can be a bath made of nonsolvent, e.g., water or a blend of water and organic liquid in which the polymer solution solvent can be dissolved.

According to certain more specific examples of these types of membrane-forming techniques, the extruded (with non-coagulated or partially coagulated polymer) film may be extruded directly into a coagulation bath, or may alternately be extruded outside of (e.g., vertically above) a coagulation bath and then enter the coagulation bath soon after extrusion. For examples of the latter, the film becomes exposed to air after being extruded from the die and before the extruded (non-coagulated) film contacts the liquid of the coagulation bath. Exposure of the extruded film to air (an "air-gap") before the film enters the coagulation bath is optional. If an air-gap is present, the amount of time to which the extruded film is exposed to air before being contacted with the coagulation bath can be as desired, e.g., less than 2 seconds, less than 1 second, or less than 0.5 second. In other example methods, the extruded film does not contact air before contacting the coagulation bath, but is directly extruded within the coagulation bath.

The type of polymer of a polymer solution and the resultant porous polymeric membrane can be any type of polymer that has been known or becomes known for use in forming a porous membrane by a NIPS or a TIPS technique. For NIPS methods in particular, examples of presently known or preferred polymers include polyamides, polyimides, polyamide-polyimides, a polysulfones such as polyethersulfone or polyphenylsulfone, and fluoropolymers such as polyvinylidene fluoride, among others. For TIPS methods in particular, examples of presently known or preferred polymers include polyolefins such as polyethylene and polypropylene, fluorinated polymers such as perfluoroalkoxy (PFA), among others. In a method that uses a single-slot die, only a single polymer and a single polymer solution are needed, although a blend of polymers can be used as well. In a method that uses a multi-slot die, e.g., a two- or three-slot die, different polymer types or polymer solutions with the same polymer but different compositions may be flowed through the different slots. As one example, a first type of polymer and a first polymer solution may be used at slots that form surfaces of the film, and one or more different polymers (or polymer solutions) may be used at one or more slots that form the interior region of the film.

Figure 3A:
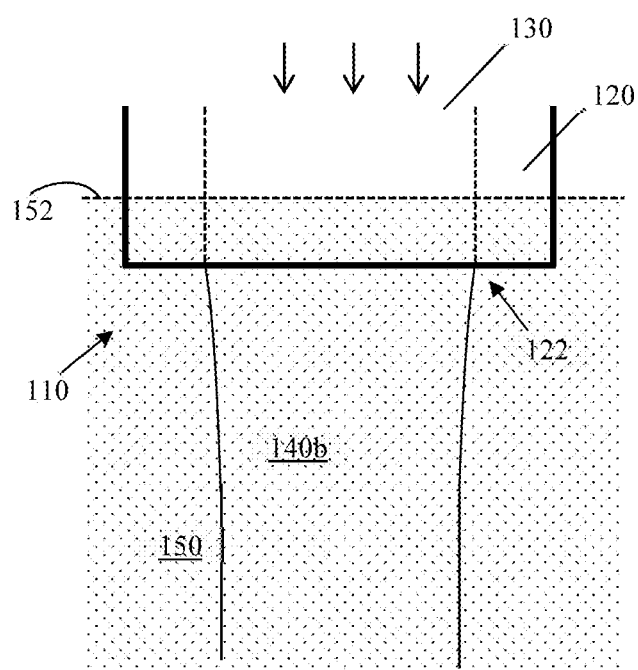
Figure 3B:
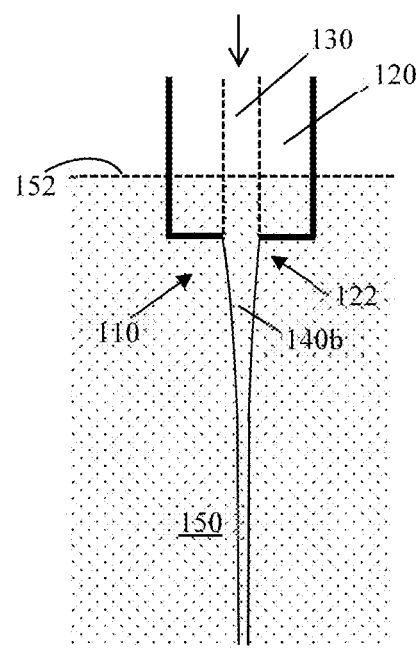

Referring now to FIGS. 2A, 2B, 3A, and 3B, illustrated are portions of example extrusion systems that are effective for preparing an example polymeric membrane as described. FIGS. 2A and 3A are front views and FIGS. 2B and 3B shows side views of the example systems.

Referring to FIGS. 2A and 2B, system 100 includes extrusion die 120, which may be a sheet extrusion die, e.g., of a type referred to conventionally as a coat-hanger manifold die. Die 120 is a single-slot extrusion die with slot 122 at a bottom of the die. Polymer solution 130 passes internally through the manifold of die 120 and then through slot 122, after which the extruded polymer solution forms extruded film 140a, which extends and travels downward in a vertical direction, unsupported, below die 120. A liquid coagulation bath 150, having an upper surface or "bathline" 152, is located below die 120.

A source (not shown) of polymer solution 130 is supplied at a steady and regular rate by a pump or other flow device to continuously flow through die 120. After leaving slot 122 in a downward direction, extruded film 140a enters and becomes submerged in liquid coagulation bath 150. Extruded film 140a exits die slot 122 as a thin continuous film of polymer solution 130 having un-coagulated polymer present in the polymer solution. To cause the dissolved polymer of polymer solution 130 of film 140a to coagulate, film 140a with un-coagulated polymer next contacts liquid of coagulation bath 150.

The liquid of coagulation bath 150 contacts both of the two opposed surfaces of film 140a starting at bathline 152 and causes coagulation of the dissolved polymer of film 140a at both surfaces. Polymer of film 140a precipitates out of solution (e.g., coagulates) to form porous polymeric film membrane 140b, containing the polymer in a coagulated form. Because the liquid of coagulation bath 150 contacts both of the two opposing surfaces of film 140a at the same time, both surfaces are affected equally by the liquid to cause the polymer to coagulate, producing film 140b having two opposing surfaces with comparable or identical morphologies.

Optionally, and as illustrated at FIGS. 2A and 2B, film 140a made of non-coagulated polymer solution 130 passes through a space ("air-gap") after exiting die slot 122 and before contacting the liquid of coagulation bath 150. Upon entering coagulation bath 150, the liquid of coagulation bath 150 causes polymer solution 130 to experience phase separation and form filter membrane 140b. Alternately, according to other example systems and methods, for example as shown at FIGS. 3A and 3B, no air-gap is present between die slot 122 and the liquid of coagulation bath 150, and the phase separation (coagulation) of the polymer of film 140a occurs immediately inside coagulation bath 150 as polymer solution 130 exists die slot 122 to form membrane 140b.

Note that these figures show an extruded film being formed from a single polymer solution using a single-slot die. In alternative methods and systems, two or more different polymer solutions (optionally one or two or more different types of polymers) may be flowed through different slots of a multi-slot extrusion die.

As one or more optional subsequent steps, a washing tank, heating step, drying step, or winding section, may be used to further handle or process membrane 140b. For example, after the phase separation (coagulation) step within coagulation bath 150, membrane 140b can be guided through a washing tank to extract residual solvent. Subsequently, the washed (still wet) membrane 140b may be collected on a roll, optionally before or after a post-processing drying step.

As shown in FIGS. 2A, 2B, 3A, and 3B, the extruded film, immediately after exiting the die, will experience a reduction in the width of the film, the thickness of the film, or both. This phenomena is sometimes referred to as "necking," i.e., the film "necks down" to a reduced width, thickness, or both, after the film exits the die and moves away from the die. Alternatively, this may be referred to as a "dog bone" effect. With this necking effect, the thickness of the extruded film may also exhibit a reduced uniformity measured across the width of the film and at the film edges—the thickness of the film may become less uniform, i.e., exhibits increased variability, across the width direction and at the edges. A specific location of reduced uniformity can occur at each edge (end) of the film, with an increased thickness (as with a dog bone) being present at each end. An additional potential advantage of the present systems and methods is a desirably high uniformity of the thickness of the film across the width of the film, including at the ends, i.e., a reduction in the dog bone effect.

A filter membrane as described can be useful to remove one or more contaminants from a liquid by passing the liquid through the filter membrane to produce a filtered liquid. The filtered liquid will contain a reduced level of one or more contaminant or particle materials, compared to a level of the contaminant or particles present in the liquid before the liquid is passed through the filter membrane.

A polymeric membrane as described can provide a useful, desirable, or advantageous combination of physical properties, including performance (filtering performance as measured by "retention"), pore size or bubble point (related to pore size), flow, and mechanical properties (flexibility and durability or reduced fragility).

A level of effectiveness of a filter membrane in removing unwanted material (i.e., "contaminants") from a liquid can be measured, in one fashion, as "retention." Retention, with reference to the effectiveness of a filter membrane (e.g., a filter membrane as described), generally refers to a total amount of an impurity (actual or during a performance test) that is removed from a liquid that contains the impurity, relative to the total amount of the impurity that was in the liquid upon passing the liquid through the filter membrane. The "retention" value of a filter membrane is, thus, a percentage, with a filter that has a higher retention value (a higher percentage) being relatively more effective in removing particles from a liquid, and a filter that has a lower retention value (a lower percentage) being relatively less effective in removing particles from a liquid.

Particle retention can be measured by measuring the number of test particles removed from a fluid stream by a membrane placed in the fluid stream. By one method, particle retention can be measured by passing a sufficient amount of an aqueous feed solution of 0.1% Triton X-100, containing 8 ppm polystyrene particles (e.g., G25 round polystyrene particles having a nominal diameter in from 5 to 15 nanometers, to achieve 1% monolayer coverage through a 47 millimeter diameter coupon sample of the membrane at a constant flow of 7 milliliters per minute, and collecting the permeate. The concentration of the polystyrene particles in the permeate can be calculated from the absorbance of the permeate. Particle retention is then calculated using the following equation:

$$\text{particle retention} = \frac{[\text{feed}] - [\text{filtrate}]}{[\text{feed}]} \times 100\%.$$

"Nominal diameter," as used herein, is the diameter of a particle as determined by photon correlation spectroscopy (PCS), laser diffraction or optical microscopy. Typically, the calculated diameter, or nominal diameter, is expressed as the diameter of a sphere that has the same projected area as the projected image of the particle. PCS, laser diffraction and optical microscopy techniques are well-known in the art (see, for example, Jillavenkatesa, A., et al.; "Particle Size Characterization;" NIST Recommended Practice Guide; National Institute of Standards and Technology Special Publication 960-1; January 2001).

In preferred embodiments of membranes as described, a membrane can exhibit a retention that exceeds 90 percent for monolayers coverages of 0.5%, 1.0%, 1.5%, and 2.0%, and may also exceed 95, 96, or 97 percent for monolayers coverages of 0.5% 1.0%, 1.5%, and 2.0%. With this level of retention, these examples of the inventive membranes exhibit a higher retention level as compared to many currently commercial filter membranes, such as comparable flat sheet and hollow fiber filter membranes made of UPE. These example membranes also allow for useful, good, or very good rates of flow (low flow time), and exhibit mechanical properties that allow the membranes to be prepared and assembled into a filter cartridge or filter product.

Bubble point is an understood property of a porous material, including of a composite filter membrane as described. Bubble point can correspond to pore size, which may correspond to filtering performance. A smaller pore size can be correlated to a higher bubble point and possibly to higher filtering performance (higher retention). Normally, however, a higher bubble point also correlates with relatively higher resistance of flow through a porous material, and a lower flux. According to certain example dual-tight membranes of this description, bubble point can be comparable when measured in either direction of flow through the membrane. A bubble point measured in one direction is considered to be comparable to bubble point measured in an opposite direction if the higher bubble point is not more than 20 percent greater than the lower of the two bubble points, e.g., the higher of the two bubble points is not more than 10, 5, 2, or 1 percent greater than the lower of the two bubble points. Bubble points that are comparable in this manner can indicate that the film has a high degree of symmetry relative to the midline of the membrane.

By one method of determining the bubble point of a porous material, a sample of the porous material is immersed in and wetted with a liquid having a known surface tension, and a gas pressure is applied to one side of the sample. The gas pressure is gradually increased. The minimum pressure at which the gas flows through the sample is called a bubble point. Examples of useful bubble points of a porous filter membrane as described, measured using Novec HFE 7200, IPA, or water, compressed air or compressed $N_2$ gas, at a temperature of from 20 to 30 (normally 25) degrees Celsius, can be in a range from 2 to 400 psi, e.g., in a range from 135 to 185 psi.

A filter membrane as described herein, or a filter or filter component that contains a filter membrane as described, can be useful in a method of filtering a liquid chemical material to purify or remove unwanted materials from the liquid chemical material, especially to produce a highly pure liquid chemical material that is useful for an industrial process that requires a chemical material input that has a very high level of purity. Generally, the liquid chemical may be any of various useful commercial materials, and may be a liquid chemical that is useful or used in any application, for any industrial or commercial use. Particular examples of filters as described can be used to purify a liquid chemical that is used or useful in a semiconductor or microelectronic fabrication application, e.g., for filtering a liquid solvent or other process liquid used in a method of semiconductor photolithography or in a cleaning method or cleaning step for processing a semiconductor wafer or a microelectronic device.

Some specific, non-limiting, examples of solvents (including cleaning solutions) that can be filtered using a filter membrane as described include: n-butyl acetate (nBA), isopropyl alcohol (IPA), 2-ethoxyethyl acetate (2EEA), a xylene, cyclohexanone, ethyl lactate, methyl isobutyl carbinol (MIBC), methyl isobutyl ketone (MIBK), isoamyl acetate, undecane, propylene glycol methyl ether (PGME), propylene glycol monomethyl ether acetate (PGMEA), or a mixture of any of these, such as mixture of PGME and PGMEA; or concentrated or dilute ammonium hydroxide, hydrogen peroxide, hydrochloric acid, HF, sulfuric acid, another peroxide solution, or combinations of these such as a combination of ammonium hydroxide and hydrogen peroxide, or a combination of hydrochloric acid and hydrogen peroxide.

The membrane can be contained within a larger filter structure such as a filter or a filter cartridge that is used in a filtering system. The filtering system will place the composite filter membrane, e.g., as part of a filter or filter cartridge, in a flow path of a liquid chemical to cause at least a portion of the flow of the liquid chemical to pass through the filter layer of the composite filter membrane, so that the filter layer removes an amount of the impurities or contaminants from the liquid chemical. The structure of a filter or filter cartridge may include one or more of various additional materials and structures that support the composite filter membrane within the filter to cause fluid to flow from a filter inlet, through the membrane (including the filter layer), and thorough a filter outlet, thereby passing through the composite filter membrane when passing through the filter.

EXAMPLE

Figure 4:
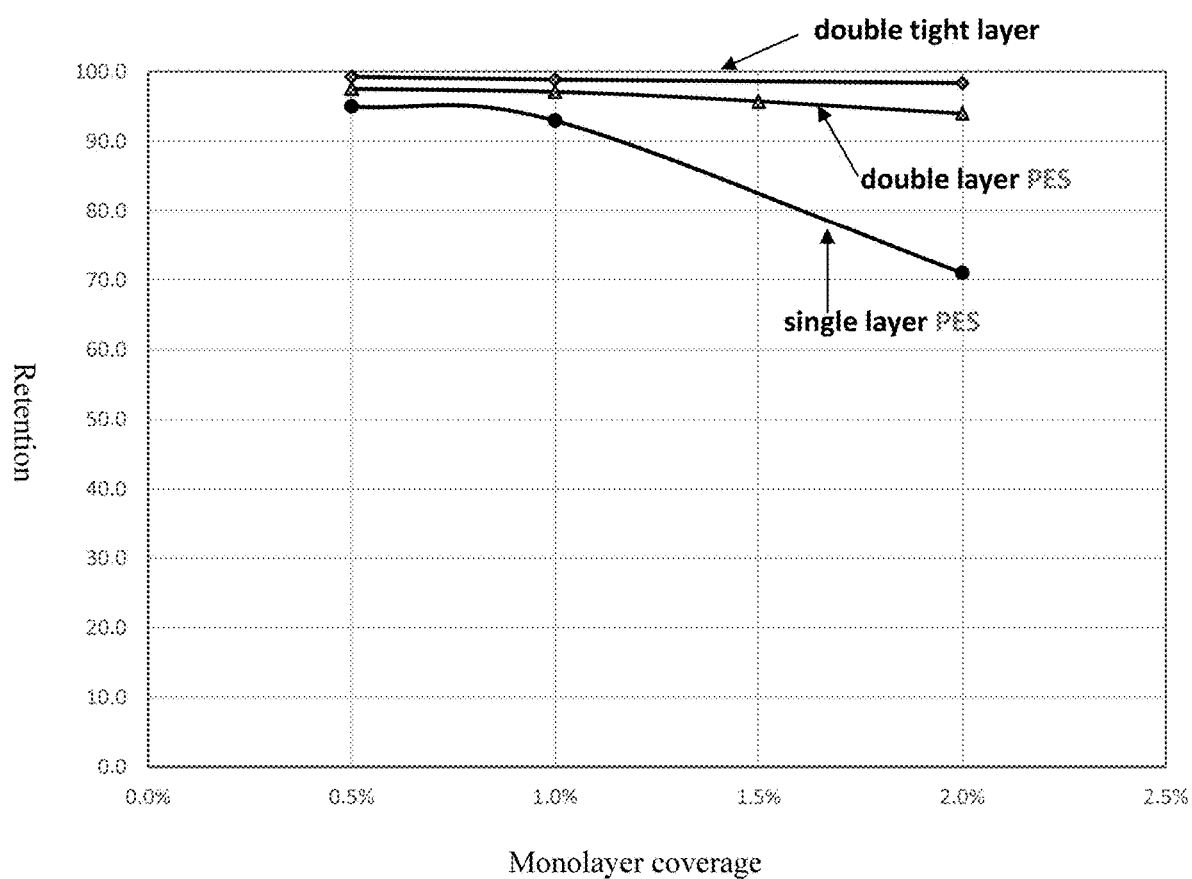
FIG. 4 shows performance data of an example filter membrane of the description.

Referring to FIG. 4, this shows a comparison of three filter membranes made of polyether sulfone, prepared by different methods, and having different structures or morphologies.

One membrane is a "single layer PES membrane." This membrane was made by a conventional phase separation method such as NIPS. The single layer PES membrane has an asymmetric profile with one side having a tight surface and the opposite side having an open surface.

One membrane is a "double layer PES membrane." This membrane is a multi-layer membrane made by stacking two of the single layer PES membranes together to use the two membranes in series.

One membrane is a "double tight layer PES membrane" prepared according to the present description.

As shown at FIG. 4, the inventive double tight layer PES membrane exhibits significantly improved retention relative to the non-inventive membranes made of the same material but with different morphology or structure.

In a first aspect, an integral extruded porous polymeric sheet membrane comprises: a first surface, a second surface, and a thickness between the first surface and the second surface, a first thickness region that includes the first surface and a portion of the membrane in a direction of the thickness, a second thickness region that includes the second surface and a portion of the membrane in a direction of the thickness, and a third thickness region extending in the direction of the thickness between the first thickness region and the second thickness region, wherein an average pore size of the first thickness region and an average pore size of the second thickness region are both less than an average pore size of the third region.

A second aspect according to the first aspect, wherein the membrane has a midline between the first surface and the second surface, the first thickness region includes depth location having a minimum pore size on a first side of the midline, and the second thickness region includes a depth location having a minimum pore size on a second side of the midline.

A third aspect according to the second aspect, wherein: the first minimum pore size is in a range from 1 nanometer to 10 microns, and the second minimum pore size is in a range from 1 nanometer to 10 microns.

A fourth aspect according to the second or third aspects, wherein: the first minimum pore size is at a location between the first surface and a depth of one third of the thickness from the first surface, the second minimum pore size is at a location between the second surface and a depth of one third of the thickness from the second surface, and the average pore size of the third thickness region is measured at the middle third of the thickness.

A fifth aspect according to any of the preceding aspects, having a degree of asymmetry of at least 5, the degree of symmetry (D) defined as: D=(average pore size of the third thickness region)/A, wherein A is one of: the average pore size of the first region; the average pore size of the second region; the first minimum pore size, or the second minimum pore size.

A sixth aspect according to any preceding aspect, wherein the membrane comprises polymer selected from polyether sulfone and polyamide-imide.

A seventh aspect according to any preceding aspect having a thickness in a range from 40 to 300 microns.

An eighth aspect according to any preceding aspect having a retention of at least 90 percent measured based on a 1 percent monolayer using G25 round polystyrene particles having a nominal diameter of 5 to 15 nanometers.

A ninth aspect according to any preceding aspect prepared by a step of non-solvent induced phase separation by which the first thickness region, the second thickness region, and the third thickness region are formed using the same phase separation step.

A tenth aspect according to any preceding aspect, consisting essentially of the extruded porous polymeric sheet membrane having the first and second surfaces, the thickness between the surfaces, the first thickness region, the second thickness region, and the third thickness region.

An eleventh aspect according to any of the first through tenth aspects consisting of the extruded porous polymeric sheet membrane having the first and second surfaces, the thickness between the surfaces, the first thickness region, the second thickness region, and the third thickness region.

In a twelfth aspect, a filter comprises the membrane of any of the first through eleventh aspects.

A thirteenth aspect comprising the membrane in a pleated configuration and contained in a housing.

In a fourteenth aspect, a method of filtering a fluid comprises passing fluid through a filter of the eleventh aspect.

A fifteenth aspect according to the fourteenth aspect, wherein the fluid is a semiconductor photolithography solvent, cleaning solution, or etching solution.

A sixteenth aspect according to the fifteenth aspect, wherein the fluid is selected from propylene glycol methyl ether (PGME), propylene glycol methylether acetate (PGMEA), cyclohexanone, n-butyl acetate.

A seventeenth aspect according to the fifteenth aspect, wherein the fluid comprises a dilute or concentrated solution comprising: ammonium hydroxide, hydrogen peroxide, hydrochloric acid, HF, sulfuric acid, a peroxide solution, or a combination thereof.

In an eighteenth aspect, a method of making an extruded porous polymeric sheet membrane having opposed first and second surfaces, a thickness between the opposed surfaces, and pores having non-uniform pore size, comprises: forming polymer-containing liquid comprising polymer in solvent, passing the polymer-containing liquid through an extrusion die to form an extruded film of the polymer-containing liquid, and exposing both sides of the extruded film to a condition that will cause coagulation of the polymer on both sides of the film.

A nineteenth aspect according to the eighteenth aspect, further comprising causing the coagulation at both sides of the extruded film by a thermally-induced phase separation technique.

A twentieth aspect according to the eighteenth aspect, further comprising causing the coagulation at both sides of the extruded film by a nonsolvent-induced phase separation technique.

A twenty-first aspect according to the eighteenth aspect, further comprising causing the coagulation at both sides of the extruded film by exposing both sides of the extruded film to humidity.

A twenty-second aspect according to the eighteenth aspect, further comprising causing the coagulation at both sides of the extruded film by evaporation of liquid at both sides of the extruded film.

A twenty-third aspect according to the eighteenth aspect, comprising contacting the first surface and the second surface of the extruded film with a coagulation bath to cause dissolved polymer of the polymer solution to coagulate and form an extruded porous polymeric membrane comprising coagulated polymer of the polymer solution.

A twenty-fourth aspect according to any of the eighteenth through twenty-third aspects, the membrane comprising: a first surface, a second surface, and a thickness between the first surface and the second surface, a first thickness region that includes the first surface and a portion of the membrane in a direction of the thickness, a second thickness region that includes the second surface and a portion of the membrane in a direction of the thickness, and a third thickness region extending in the direction of the thickness between the first thickness region and the second thickness region, wherein an average pore size of the first thickness region and an average pore size of the second thickness region are both less than an average pore size of the third region.

A twenty-fifth aspect according to twenty-third or twenty-fourth aspects, wherein: the extruded film exits the die at a die opening, and the die opening is submersed in the coagulation liquid.

The invention claimed is:

1. An integral extruded porous polymeric sheet membrane comprising:
   a first surface, a second surface, and a thickness between the first surface and the second surface,
   a first thickness region that includes the first surface and a portion of the membrane in a direction of the thickness,
   a second thickness region that includes the second surface and a portion of the membrane in a direction of the thickness, and
   a third thickness region extending in the direction of the thickness between the first thickness region and the second thickness region,
   wherein an average pore size of the first thickness region and an average pore size of the second thickness region are both less than an average pore size of the third thickness region, and wherein the membrane exhibits a retention of at least 90% measured using round polystyrene particles having a diameter of 5 to 15 nanometers.

2. The membrane of claim 1, wherein
   the membrane has a midline between the first surface and the second surface,
   the first thickness region has a first minimum pore size at a first location between the first surface and the midline, and
   the second thickness region has a second minimum pore size at a second location between the second surface and the midline.

3. The membrane of claim 2, wherein:
   the first minimum pore size is at a depth of one third of the thickness from the first surface, and
   the second minimum pore size is at a depth of one third of the thickness from the second surface.

4. The membrane of claim 1 having a degree of asymmetry of at least 5, the degree of asymmetry (D) defined as:

$D$=(average pore size of the third thickness region)/$A$ wherein A is one of: the average pore size of the first region; the average pore size of the second region; the first minimum pore size, or the second minimum pore size.

5. The membrane of claim 1, wherein the membrane comprises polymer selected from polyether sulfone and polyamide-imide.

6. The membrane of claim 1 having a thickness in a range of from 40 to 300 microns.

7. The membrane of claim 1 prepared by a step of non-solvent induced phase separation by which the first thickness region, the second thickness region, and the third thickness region are formed using the same phase separation step.

8. A filter comprising the membrane of claim 1.

9. A method of filtering a fluid, the method comprising passing fluid through an integral extruded porous polymeric sheet membrane comprising:
   a first surface, a second surface, and a thickness between the first surface and the second surface,
   a first thickness region that includes the first surface and a portion of the membrane in a direction of the thickness,
   a second thickness region that includes the second surface and a portion of the membrane in a direction of the thickness, and
   a third thickness region extending in the direction of the thickness between the first thickness region and the second thickness region,
   wherein an average pore size of the first thickness region and an average pore size of the second thickness region are both less than an average pore size of the third thickness region, and wherein the membrane exhibits a retention of at least 90% measured using round polystyrene particles having a diameter of 5 to 15 nanometers.

10. The method of claim 9, wherein the fluid is a semiconductor photolithography solvent, cleaning solution, or etching solution.

11. The method of claim 9, wherein the fluid is selected from propylene glycol methyl ether (PGME), propylene glycol methylether acetate (PGMEA), cyclohexanone, n-butyl acetate.

12. The method of claim 9, wherein the fluid comprises a dilute or concentrated solution comprising: ammonium hydroxide, hydrogen peroxide, hydrochloric acid, HF, sulfuric acid, a peroxide solution, or a combination thereof.

13. A method of making an integral extruded porous polymeric sheet membrane, the method comprising:
    forming a polymer-containing liquid comprising polymer in solvent,
    passing the polymer-containing liquid through an extrusion die to form an extruded film of the polymer-containing liquid, and
    exposing both sides of the extruded film to a condition that will cause coagulation of the polymer on both sides of the film,
    wherein the integral extruded porous polymeric sheet membrane comprises:
    a first surface, a second surface, and a thickness between the first surface and the second surface,
    a first thickness region that includes the first surface and a portion of the membrane in a direction of the thickness,
    a second thickness region that includes the second surface and a portion of the membrane in a direction of the thickness, and
    a third thickness region extending in the direction of the thickness between the first thickness region and the second thickness region,
    wherein an average pore size of the first thickness region and an average pore size of the second thickness region are both less than an average pore size of the third thickness region, and wherein the membrane exhibits a retention of at least 90% measured using round polystyrene particles having a diameter of 5 to 15 nanometers.

14. The method of claim 13, further comprising causing the coagulation at both sides of the extruded film by a thermally-induced phase separation technique.

15. The method of claim 13, further comprising causing the coagulation at both sides of the extruded film by a nonsolvent-induced phase separation technique.

16. The method of claim 13, further comprising causing the coagulation at both sides of the extruded film by exposing both sides of the extruded film to humidity.

17. The method of claim 13, further comprising causing the coagulation at both sides of the extruded film by evaporation of liquid at both sides of the extruded film.

18. The method of claim 13, further comprising causing coagulation at both sides of the extruded film by contacting the first surface and the second surface with a coagulation bath.

19. The method of claim 13, wherein:
    the extruded film exits the extrusion die at a die opening, and
    the die opening is submersed in the coagulation liquid.

* * * * *